(12) United States Patent
Albagli et al.

(10) Patent No.: US 11,896,934 B2
(45) Date of Patent: Feb. 13, 2024

(54) POROUS POLYMERIC MEMBRANE WITH TEAR PREVENTION RING

(71) Applicant: Global Life Sciences Solutions Operations UK Limited, Buckinghamshire (GB)

(72) Inventors: Douglas Albagli, Clifton Park, NY (US); William A. Hennessy, Schenectady, NY (US)

(73) Assignee: Global Life Sciences Solutions Operations UK Limited, Buckinghamshire (GB)

( * ) Notice: Subject to any disclaimer, the term of this patent is extended or adjusted under 35 U.S.C. 154(b) by 412 days.

(21) Appl. No.: 17/115,054

(22) Filed: Dec. 8, 2020

(65) Prior Publication Data

US 2022/0176325 A1    Jun. 9, 2022

(51) Int. Cl.
| | | |
|---|---|---|
| *B01D 67/00* | (2006.01) | |
| *B01D 69/02* | (2006.01) | |
| *B01D 71/64* | (2006.01) | |

(52) U.S. Cl.
CPC ......... *B01D 67/0034* (2013.01); *B01D 69/02* (2013.01); *B01D 71/64* (2013.01); *B01D 2323/24* (2013.01); *B01D 2323/28* (2013.01); *B01D 2323/34* (2013.01); *B01D 2325/021* (2013.01); *B01D 2325/24* (2013.01)

(58) Field of Classification Search
CPC ............ B01D 67/0032; B01D 67/0034; B01D 67/006; B01D 67/0062
See application file for complete search history.

(56) References Cited

U.S. PATENT DOCUMENTS

| | | |
|---|---|---|
| 7,784,619 B2 | 8/2010 | Jacobson |
| 2009/0188864 A1 | 7/2009 | Zheng et al. |
| 2010/0181288 A1 | 7/2010 | Tang et al. |
| 2021/0308628 A1 | 10/2021 | Hennessy et al. |
| 2021/0308634 A1 | 10/2021 | Hennessy et al. |
| 2022/0111338 A1 | 4/2022 | Stankowski et al. |

FOREIGN PATENT DOCUMENTS

| | | | | |
|---|---|---|---|---|
| DE | 102013203050 A1 * | 8/2014 | ......... | B01D 67/0062 |
| WO | 9513860 A1 | 5/1995 | | |
| WO | 9610966 A1 | 4/1996 | | |
| WO | 2009158279 A1 | 12/2009 | | |
| WO | 2013043124 A1 | 3/2013 | | |
| WO | 2021204715 A1 | 10/2021 | | |
| WO | 2021204716 A1 | 10/2021 | | |

OTHER PUBLICATIONS

Search Report received in International Application No. PCT/EP2021/082844 dated Mar. 7, 2022, 7 pages.
Written Opinion received in International Application No. PCT/EP2021/082844 dated Mar. 7, 2022, 6 pages.

\* cited by examiner

*Primary Examiner* — Ryan B Huang
(74) *Attorney, Agent, or Firm* — Jeff B. Vockrodt; Culhane Meadows PLLC (57) ABSTRACT

Porous liquid-filtering membranes are provided having a boundary region substantially surrounding the pore region and having greater tear resistance than the pore region.

12 Claims, 6 Drawing Sheets

FIG. 5

POROUS POLYMERIC MEMBRANE WITH TEAR PREVENTION RING

BACKGROUND OF THE INVENTION

Figure 1:
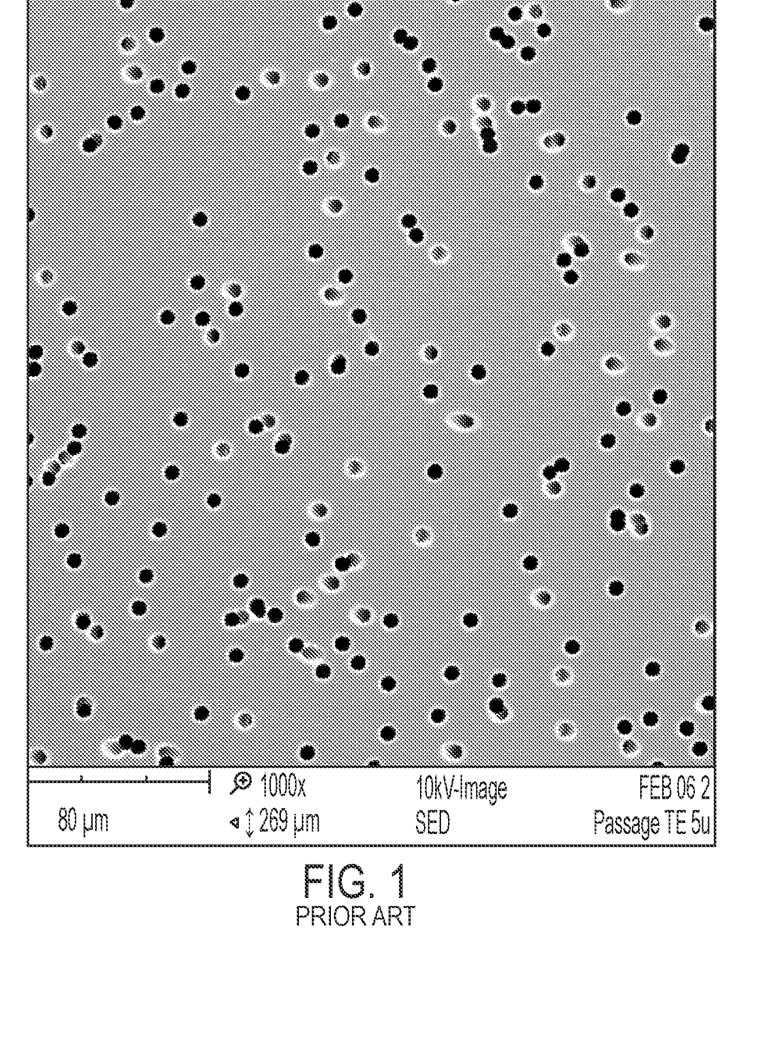
FIG. 1 shows the surface of a porous membrane that is made according to a track etch process.

Porous membranes are used in various biological filtration processes. The membranes are made from a thin layer of polymeric material with holes that are formed in the material. One such material is prepared by a process called Track-Etch, which is shown in FIG. 1. The Track-Etch material is made by exposing a membrane film to heavy ions from a reactor. Heavy ions are directed toward the membrane under vacuum conditions. The heavy ions produce holes in the membrane resulting in a porous membrane. Owing to the randomness of the process, the resulting holes are distributed randomly in the membrane surface. The randomness also contributes to non-uniformity in the holes, such as various angular profiles in the same membrane. There is a possibility that the process results in some holes that are larger than intended due to overlap in the holes.

Photolithography has been used to make a membrane material. U.S. Pat. No. 7,784,619 to Jacobsen and assigned to Baxter International, Inc. describes a photolithographic method for making a membrane. These processes used conventional semiconductor manufacturing techniques to make membrane having a desired series of holes.

The present inventors have found that standard techniques for semiconductor manufacturing are incapable of providing large surface area membranes having desirable properties. It is difficult to produce a large-surface-area membrane that lays flat on a surface. One problem is curling of the membrane material after it is detached from the support. Other issues include contamination of the membrane from the hard mask layer, which is necessary to produce high aspect ratio holes in the membrane. In some applications it may be desirable to produce a membrane free of metallic contaminants.

Accordingly, the present invention seeks to improve microporous membranes and their methods of manufacture.

SUMMARY OF THE INVENTION

In one aspect, the invention involves a liquid-filtering tear-resistant porous polymeric membrane that includes a pore region and a tear-resistant boundary region substantially surrounding the pore region and having a tear-resistance that is greater than that of the pore region. The pores may be photolithographically defined to have a minimum dimension of less than 100 microns. The greater tear resistance can come from one or more factors including the region having no pores, the region having a lower density of pores, and/or a region having thicker structures between pore regions (e.g., a network of crossing walls).

Methods are provided for making a tear-resistant liquid-filtering porous membrane comprise defining a pore region in a polymeric membrane using a photolithography process, the pore region comprising a plurality of pores having a minimum dimension of less than 100 microns; and defining a tear-resistant boundary region in the polymeric membrane, the tear-resistant boundary region substantially surrounding the pore region, wherein the tear-resistant boundary region has a tear-resistance that is greater than that of the pore region.

One method for making a tear-resistant liquid-filtering porous membrane comprises: a) depositing a photoresist layer on the top surface of a substrate, the substrate comprising a support layer, a polymer layer, and a hard mask layer; b) exposing the photoresist to a pattern of light; c) developing the photoresist layer to provide a first pattern of openings in the photoresist layer that expose portion of the hard mask layer; d) etching the exposed portions of the hard mask layer to provide a second pattern of openings in the hard mask layer that expose portions of the underlying polymer layer; e) removing the photoresist; f) etching the polymer layer through the openings in the hard mask layer thereby providing a third pattern of openings in the polymer layer, the third pattern of openings including a pore region and a segmentation region surrounding the pore region with a tear-resistant boundary region between the pore-region and the segmentation region, the pore region comprising a plurality of pores having a minimum dimension of less than 100 microns; g) removing the hard mask layer; and, and h) releasing the polymer layer from the substrate, thereby providing the tear-resistant liquid-filtering porous membrane porous membrane, wherein the pore region and the tear-resistant boundary region are defined by the pattern of light.

Other known methods may be used to define the pore region, such as methods that utilize removal of sacrificial material layer.

DETAILED DESCRIPTION OF THE INVENTION

The present invention involves production of a polymeric membrane having porous regions surrounding by a tear prevention region (e.g., tear prevention ring) surrounding the porous region. The porous region includes uniformly spaced photolithographically-defined pores, which depending on the thickness of the polymeric membrane material tend to tear along the perforations, similar to a postage stamp. As polymeric membrane materials are made thinner and/or the spacing between adjacent pores decreases, the tendency of the material to tear during use or during delamination from the support substrate upon which is its built increases. The present inventors have found that providing a tear-resistant region of non-porous material around the porous region can prevent tearing of the membrane. This enables denser pore distribution and/or thinner membrane materials than previously possible.

The forming of porous regions in a polymeric membrane are described in U.S. patent application Ser. No. 16/842,402, entitled "POROUS FLAT DEFORMATION-RESISTANT MEMBRANE" which was filed Apr. 7, 2020, and Ser. No. 16/842,448, entitled "BIOCOMPATIBLE HIGH ASPECT-RATIO POROUS MEMBRANE" which was filed Apr. 7, 2020, each of which is incorporated by reference herein. Other methods for making porous membrane that can benefit from a tear prevention layer are described in U.S. patent application Ser. No. 17/067,528, entitled "TANGENTIAL FLOW CASSETTE-HF EMULATION" and filed Oct. 9, 2020, which describes such polymeric membranes and techniques. These methods allow formation of pores having a minimum pore size defined by the thickness of a sacrificial layer. Either photolithographic method can be used to make porous membranes filters having tear-prevention regions in accordance with the present invention.

The process of the of defining pore regions is capable of producing biocompatible membranes and use materials and techniques that avoid leaving residual components in the polymeric material after processing. For example, the etching mask is chosen from a material that does not react with components of the polymer such as carbon. Avoiding these surface reactions is important for biological membranes that must not contaminate materials they are intended to filter. The hard mask material and etching conditions may be chosen in order to minimize the level of residual hard mask material found in the membrane. The residual material includes elemental impurities from the hard mask material, including for example aluminum or silicon elements. In one embodiment, the membrane comprises a biologically insignificant amount of residual hard mask material. The amount of hard mask material on the surface of the polymer in one embodiment is preferably at or below 0.15 $\mu g/cm^2$, more preferably below 0.10 $\mu g/cm^2$, and most preferably below 0.01 $\mu g/cm^2$.

As shown in FIG. 2 and described herein, one exemplary process for making the membranes having a tear-resistant boundary region first involves providing base substrate layer 100. A membrane layer 102 is formed on the base layer 100. A hard mask layer 103 is formed on the polymer layer 102. And a photomask layer 104 is provided on the hard mask layer 103.

Figure 2A:
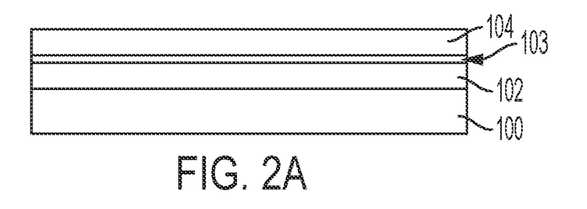
FIG. 2(a) shows a step in the manufacture of a membrane according to an embodiment of the present invention.

The base substrate 100 may be made from glass, for example. Other suitable materials include silicon or metal. The membrane layer 102 is a polymer layer. In one preferred aspect of the invention, the membrane layer 102 and base 100 have a similar coefficient of thermal expansion. The inventors have observed that when the thermal expansion characteristics of the polymer layer 102 and base layer 100 are matched, the resultant membrane resists deformation. This is a desirable property because membranes that lay flat are easier for end-users to work with. One desirable material is polyimide. There are many grades of polyimide with different CTE values. In one aspect, a polyimide is used that has a CTE similar to that of glass. The polyimide may be applied to and cured on a substrate where the CTE of the cured polyimide substrate matches that of the glass. The inventors have found that the greater the difference between the glass and polymer membrane layer (e.g., polyimide), the more likely it is that the polymer will not lay flat when released from the glass.

In one embodiment, the polyimide has a CTE of 3 ppm/° C. between 50° C. and 200° C. at a 20 micron thickness, and the glass has a CTE of 3.2 ppm/° C. between 50° C. and 200° C. As noted above the CTE of the polymer and base layer should be within a range of ±25% of each other, more preferably ±15% of each other, and most preferably within ±10%. For example, as noted above the CTE of glass is about 7% higher than that of the polyimide layer.

Suitable materials for the membrane layer 102 may include polyimide, polyamide, polycarbonate, polyetherimide, polyether ketone, polyurethane, synthetic polymers, low-density polyethylene (LDPE), high-density polyethylene (HDPE), polypropylene (PP), polyvinyl chloride (PVC), polystyrene (PS), nylon, TEFLON® (polytetrafluoroethylene),thermoplastic polyurethanes (TPU), polyethylene, acrylate polymers, acrylate monomers, or acrylate elastomers. The membrane layer 102 may be coated onto the base 100 using spin coating, spray coating, meniscus coating, slot die coating, dip coating, extrusion coating, lamination (with adhesive attachment to substrate). The membrane layer 102 may be cured using thermal curing, UV curing, or a combination of both.

The hard mask layer 103 is typically an inorganic material that can be etched selectively relative to polymeric material, such as the membrane layer or the photomask layer. The inorganic layer is desirably made from a material that does not react in any way with the membrane layer 102. For example, although aluminum is a well-known etching mask layer, Al may react with polyimide of the membrane layer to form Al—C. This is undesirable as any metal contamination would likely render the membranes incompatible with bioprocess applications. Preferably, the hard mask layer is made from an aluminum alloy that exhibits little or no reaction with the polymer of the underlying membrane layer 102. The hard mask layer 103 may be deposited using one or more of physical vapor deposition, evaporation, chemical vapor deposition, and/or spray coating.

Suitable hard mask materials include inorganic material, organic material, multilayer of inorganic and organic materials. More specifically, the hard mask materials may include metals, insulators, semiconductors, photoresists, inorganic materials, organic materials, multilayer films or combinations thereof. In certain embodiments, the hard mask may include hydrogenated amorphous SiN (SiN:H) or hydrogenated amorphous SiO (SiO:H). 00

The photoresist layer 104 is desirably a photoresist material that can be exposed and pattered using lithography techniques commonly used for semiconductor and flat panel display manufacturing. The photoresist material can be either a positive or negative photoresist. The photoresist material is typically deposited using a spinning technique to a desired thickness and then cured. The polyimide may also be coated using extrusion coating. The photoresist is then subjected to a pattern of light that determines the pattern of the photoresist material upon development of the photoresist. A positive photoresist leaves material in regions not exposed to light, and is removed upon development in regions exposed to light. A negative photoresist is the opposite. Namely, a negative photoresist remains in regions exposed to light, and is removed in regions not exposed to light upon development.

The structure shown in FIG. 2(a) represents a cross section of the base membrane layer 102, the hardmask layer 103, and the photoresist layer 104. This material may be either made at the time it is patterned, or made in advance and patterned at a later time. The overall shape is not critical, and may be in the form of a disc, a square, or a rectangle. The present invention may be used to provide large area porous membranes, including those having a surface area exceeding 0.1 m$^2$. Much larger substrates and membrane layers may be made as desired as further described herein.

Figure 2B:
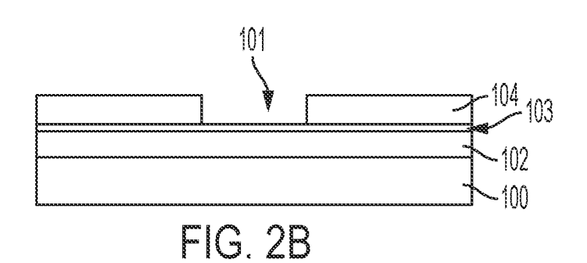
FIG. 2(b) shows a subsequent step after that shown in FIG. 2(a) in the manufacture of a membrane according to an embodiment of the present invention.

The first step in making the membrane from the structure of FIG. 2(a) is to provide a patterned photoresist layer 104 by exposing the surface of the photoresist to a light pattern, and developing the photoresist to leave the photoresist pattern shown in FIG. 2(b) and described herein. The location of light exposure depends on whether a positive or negative photoresist is used. The photoresist 104 in FIG. 2(b) includes an opening 101 in the photoresist layer. The opening 101 in the photoresist layer 104 is formed upon development after exposing the photoresist 104 to a light pattern.

Figure 2C:
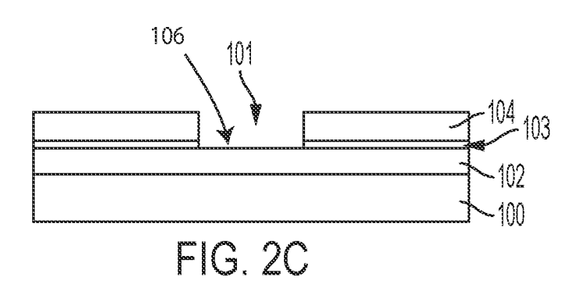
FIG. 2(c) shows a subsequent step after that shown in FIG. 2(b) in the manufacture of a membrane according to an embodiment of the present invention.
Figure 2D:
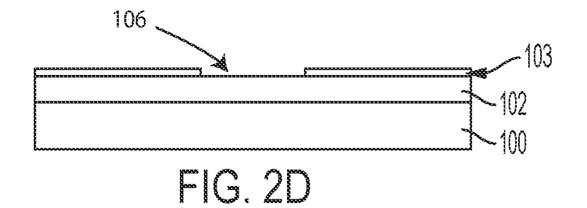
FIG. 2(d) shows a subsequent step after that shown in FIG. 2(c) in the manufacture of a membrane according to an embodiment of the present invention.

After forming the opening 101, the hard mask 103 is etched in the location of the opening 101 to form the hard mask opening 106 as shown in FIG. 2(c) and described herein. The etching of the hard mask 103 may be performed using one or more of wet chemical etch, plasma etch, non-reactive sputtering, or combinations of these techniques. In one aspect, the hard mask is etched using a combination of acetic acid, phosphoric acid, nitric acid, and water. In one aspect, the hard mask layer is etched with ammonium fluoride (NH$_4$F) and hydrofluoric acid (HF). The etching is often conducted at elevated temperature. As noted above, the material of the hard mask layer should be chosen to be non-reactive with the underlying polymer of the membrane layer 102 at the temperatures encountered during processing, include etching of the hard mask 103.

It should be appreciated that the hard mask layer is critical to providing a mask for the subsequent etching of holes in the membrane layer 102. Although hard mask materials are known, many existing hard mask materials will react with carbon in the underlying membrane layer 102. For instance, the present inventors have observed that Al—C is formed in the membrane layer when aluminum is used as a hard mask on a polyimide film. These reactions take place in part because the elevated temperature at which the substrate is exposed during manufacture. For these reasons, it is desirable to use a hard mask material free of potential metal contaminants, such as SiN or SiH as noted above.

Figure 2E:
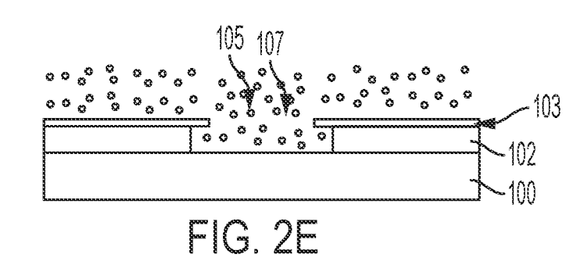
FIG. 2(e) shows a subsequent step after that shown in FIG. 2(d) in the manufacture of a membrane according to an embodiment of the present invention.

After patterning of the hard mask layer 103 to form opening 106, the photoresist may be removed using an NMP-based solvent or the like, and then the membrane layer 102 can be patterned to form opening 107. The patterning of the membrane layer 102 through the hard mask opening 106 is shown in FIG. 2(e) and described herein. This is an etching process designed to selectively remove the polymeric membrane layer within the hard mask opening 106. The etching technique may include a wet chemical etch, plasma etch, non-reactive sputtering, or combinations of these techniques. Notably, the material must be etched sufficiently to expose the underlying base layer 100 through the membrane layer opening 107. At this stage of making a membrane filter, the pores within the pore region and any segmentation region may be formed simultaneously.

Figure 2F:
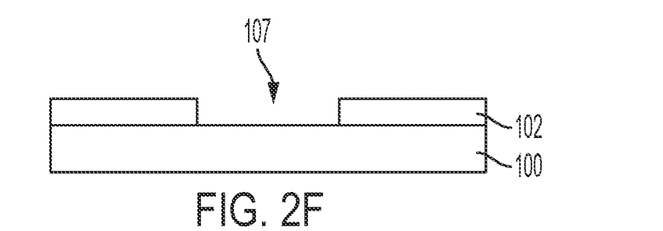
FIG. 2(f) shows a subsequent step after that shown in FIG. 2(e) in the manufacture of a membrane according to an embodiment of the present invention.

After etching the membrane layer 102 to form the membrane layer opening 107, the hard mask layer 103 should be removed as shown in FIG. 2(f) and described herein. The removal of the hard mask layer 103 is desirably conducted in a manner that is selective relative to the membrane layer 102.

Figure 2G:
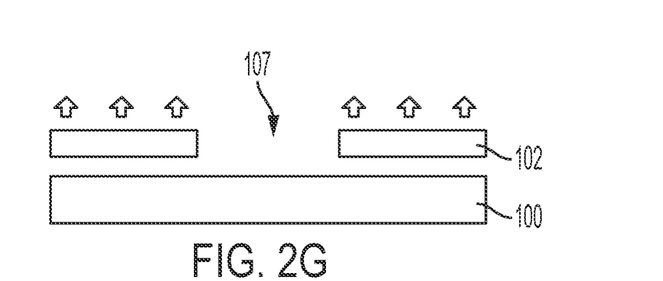
FIG. 2(g) shows a subsequent step after that shown in FIG. 2(f) in the manufacture of a membrane according to an embodiment of the present invention.

After removal of the hard mask layer 103, the patterned membrane layer 102 is separated from the base layer 100 as shown in FIG. 2(g) and described herein. The membrane layer 102 may be released using a mechanical release technique, a laser release technique, a solution-based release technique, or a thermal release technique or combinations of these techniques. In the case where many membrane filters are defined on the same substrate, the filters may be separated from the glass substrate at this time.

The base layer and membrane layer must be selected to allow for release of the layer after patterning, yet have sufficient adhesion to withstand processing. In one embodiment, the base 100 is made from glass and the membrane layer 102 is polyimide. In a preferred embodiment, the base 100 and membrane 102 are selected to have a similar coefficient of thermal expansion. The present inventors found that matching the CTE of the base 100 and membrane layer 102 is important to provide a flat membrane upon delamination from the base. Where the CTE is not matched, the membrane will tend to curl upon delamination which is undesirable.

The membrane 102 may be separated from the base 100 using a mechanical process, or a combination of chemical and mechanical processes. The membrane for instance may be removed using a laser liftoff (LLO) technique. Alternatively, or in addition, the membrane can include a de-bonding layer (DBL) intermediate the membrane 102 and the base layer 100. In a preferred aspect a membrane 102 layer and base 100 layer are chosen so that they be easily separated without using LLO or a DBL.

In one embodiment the pores are designed to have dimensions ranging from 1-100 microns, more preferably within the range of 1-10 microns, more preferably within the range of 1-5 microns, and most preferably about 2 microns. One preferred membrane filter has a membrane thickness of 10 microns with pores that have an exit diameter of 2 microns. The dimensions above may be a diameter in the case of a circular shaped pore, or may be a minimum dimension and a maximum dimension in the case of an irregular-shaped pore.

The thickness of the membrane together with the diameter of the pores determines the aspect ratio of the pores. The thickness of the membrane will often be within the range of 5 to 25 microns. The aspect ratio may range from 0.5:1 to up to 20:1, preferably between 1:1 to 10:1, more preferably between 2:1 to 5:1 and most preferably about 3:1. In one aspect, the present invention is capable of producing membranes having pore size distributions of desired size with low variability. In one aspect, the variability may be characterized as pore size standard deviation. The standard deviation of pore size is desirably less than 0.70 microns, and more desirably less than 0.50 microns, still more desirably less than 0.30 microns. In another aspect the standard deviation of pore size may range from between 0.1 to 0.5 microns, more desirably between 0.15 and 0.4 microns, and more preferably between 0.15 and 0.3 microns. Table 1 shows pore size and standard deviation of membranes according to the present invention:

TABLE 1

| Design values | | Present | | |
|---|---|---|---|---|
| Hard mask hole size (μm) | Pore-to-pore pitch distance (μm) | invention membrane ID | Pore size (exact) (μm) | stdev (exact) (μm) |
| 5 μm | 17.5 μm | Sample 1 | 5.42 | 0.24 |
| 5 μm | 17.5 μm | Sample 2 | 5.27 | 0.28 |
| 5 μm | 25 μm | Sample 3 | 5.67 | 0.39 |
| 5 μm | 25 μm | Sample 4 | 5.63 | 0.32 |
| 5 μm | 35 μm | Sample 5 | 5.47 | 0.33 |
| 5 μm | 35 μm | Sample 6 | 5.17 | 0.23 |
| 8 μm | 25 μm | Sample 7 | 10.32 | 0.23 |
| 8 μm | 25 μm | Sample 8 | 9.97 | 0.45 |
| 8 μm | 35 μm | Sample 9 | 11.26 | 0.18 |
| 8 μm | 35 μm | Sample 10 | 10.79 | 0.19 |
| 8 μm | 50 μm | Sample 11 | 11.01 | 0.18 |
| 8 μm | 50 μm | Sample 12 | 10.82 | 0.70 |

These results were based on 15 measuring points on each 100×150 mm sheet. A few areas were observed where smaller holes, which suggests there may have been debris closing up the pores. The presence of a few larger pores appear to have resulted from faults in the mask. During production, faults in the mask may be remedied by replacing the mask.

The membranes of the present invention have a pore size distribution that can reliably separate materials based on size. The retention efficiency of the membranes were determined by challenging the membrane with suspensions of uniform particles (polystyrene microspheres) of a known size and concentration and then quantifying the particles able to pass through the membrane (downstream of the membrane). Polystyrene beads used in these tests were non-functionalized and un-dyed. Three bead size distributions with nominal sizes of 6, 10 and 12 microns were tested. The comparative membrane was GE Healthcare TEM Nucleopore nominal size 10 μm. The membrane of present invention used in the test had an exact size 10.3 μm±0.2 μm (statistical evaluation based on SEM microscopy images). As shown in Table 2, the membrane of the present invention exhibited a very low standard deviation in mean retention compared to the commercially available track-etch membranes, showing the reliability of the membranes of the present invention in terms of pore size reproducibility.

TABLE 2

| Sample | Pore size [μm] | 6 μm latex beads challenge | | 10 μm latex beads challenge | | 12 μm latex beads challenge | |
|---|---|---|---|---|---|---|---|
| | | Mean retention | stdev | Mean retention | stdev | Mean retention | stdev |
| Nucleopore | 10 (nominal) | 0% | 0% | 89% | 15% | 85% | 20% |
| Present invention membrane | 10.3 μm ± 0.2 (exact) | 0% | 1% | 86% | 2% | 100% | 0% |

The porous membrane of the present invention has the desirable property that it does not curl after delamination from the support. This feature becomes more critical as the surface area of the membranes being produced increases. For example, when the surface area of the membrane is 4,000 mm² or greater, the inventors have observed the tendency of the membrane to curl after delamination from the base. Prior attempts at developing porous membranes with photolithography/etching utilized polymer layers having an undefined coefficient of thermal expansion making it difficult to produce them without curling upon delamination, particularly at the large surface areas claimed. These limitations severely limited the size in surface area of the membranes.

The desired level of deviation, or the deviation ratio calculated as the ratio of maximum deviation from the flat plane when the membrane is self-supporting, divided by length of that membrane across the flat surface, is 0.2 or less.

Jurkat cells (human lymphoma) were cultured in RPMI medium supplemented with fetal bovine serum and an antibiotic complex (streptomycin and penicillin), and passaged twice before being utilized in experimentation. Cells were cultured as they were (control), as well as in the presence of GE Healthcare TEMNucleopore and present invention membranes for a total of 7 days, constantly monitored and kept in the exponential phase of growth (controlled directly through cell number control). Cell viability in all groups (control, Track Etch and present invention membrane) was deduced quantitatively using the Nucleocounter 200 (Chemometec) and it is respective via-1 cassette consumables, at days 1 and 7, as shown in Table 3.

TABLE 3

| | % Viability Day 1 | % Viability Day 7 |
|---|---|---|
| Control | 95.8 | 95.4 |
| TEM Nucleopore | 95.4 | 96.4 |
| Present Invention Membrane | 95.4 | 96.8 |

The results show no difference in viability of Jurkatcells cultured in the presence of the membranes and the control, hence no cytotoxicity.

Figure 3:
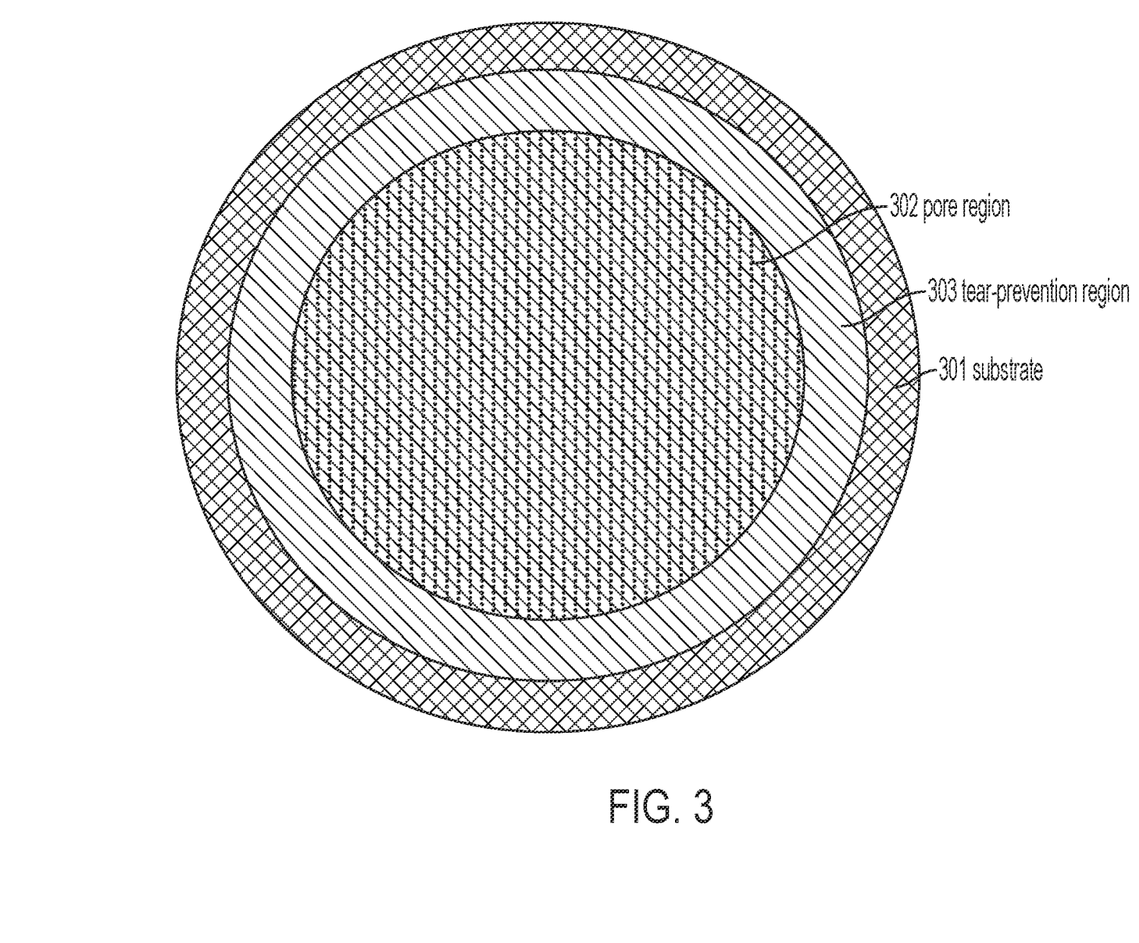
FIG. 3 shows a top-down view of a membrane filter with a tear prevention ring according to one embodiment of the invention.
Figure 4:
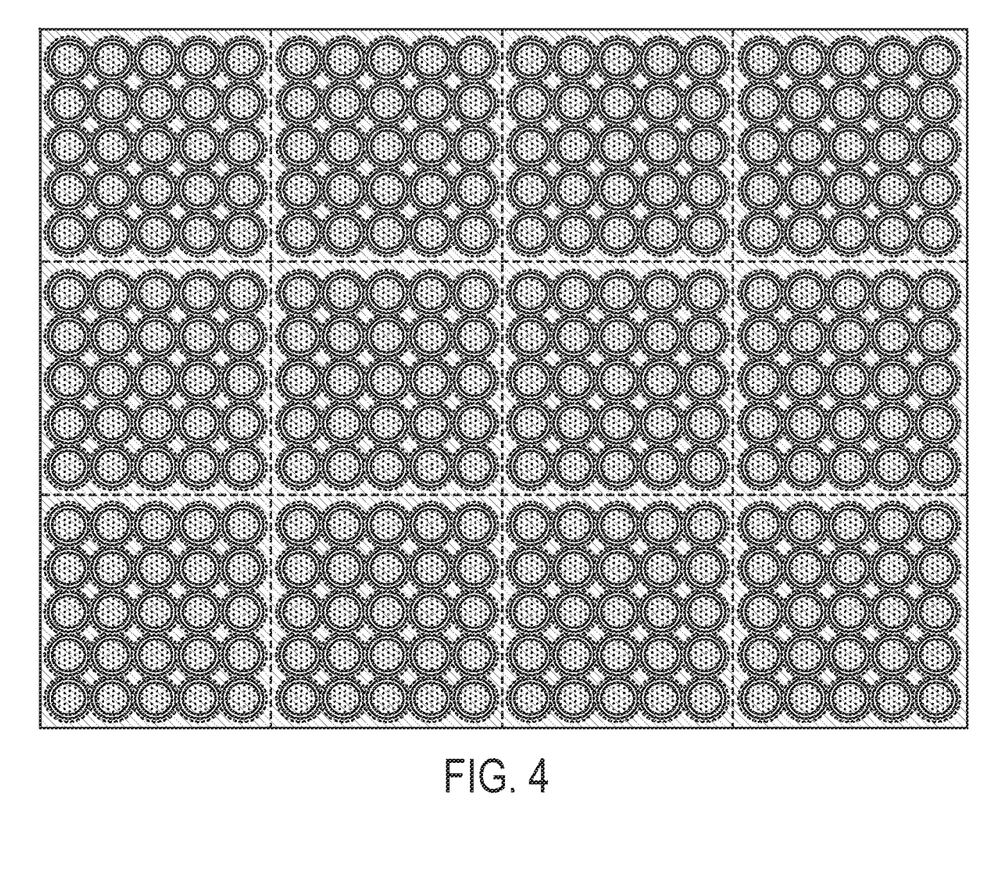
FIG. 4 shows a top down view of circular filters prepared on a large sheet according to one embodiment of the invention.

FIG. 3 shows a top down view of a pattern showing an individual membrane filter according to one embodiment of the invention. The membrane filter formed from polyimide film on a substrate 301, the polyimide film has a central circular pore region 302 and a tear prevention ring 303 surrounding the circular pore region 302. The porous region includes holes that are made in accordance with the process shown in FIG. 2. The portion of the substrate 301 is exposed through a segmentation ring. The segmentation ring may be defined photolithographically at the same time that the holes are made in the porous region 302. FIG. 4 shows a large substrate where 300 membrane filters have been defined using the process shown in FIG. 2. Each individual membrane filter is separated from adjacent polyimide with a segmentation ring.

Figure 5:
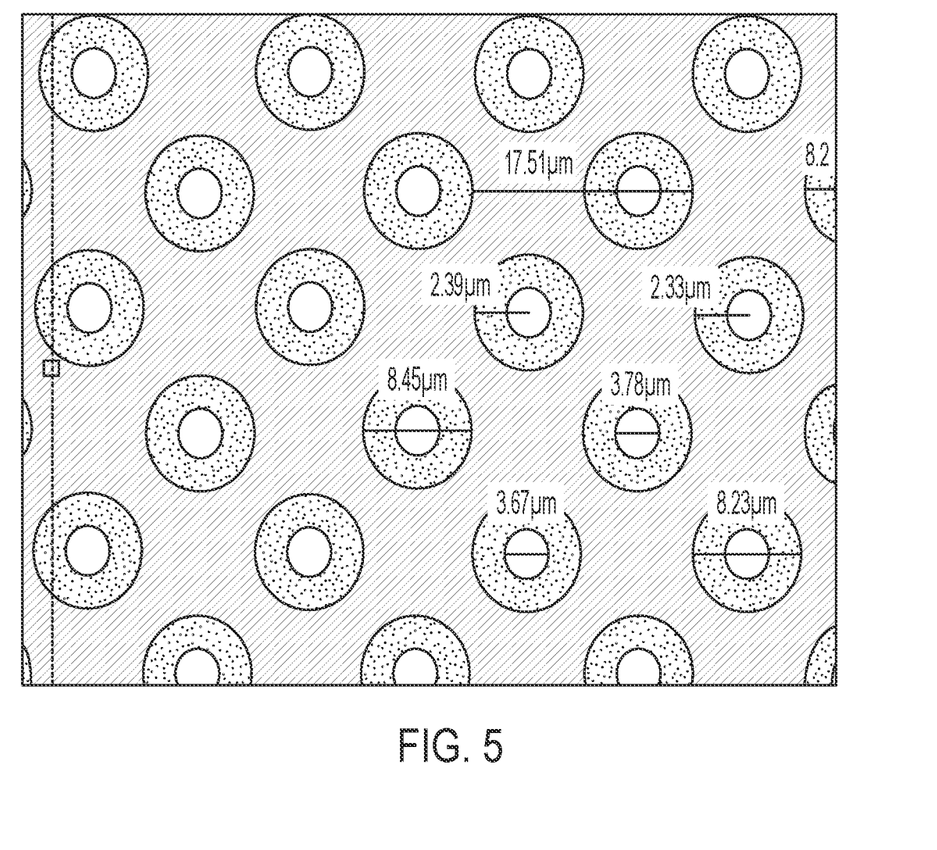
FIG. 5 shows a scanning electron microscope (SEM) image of pores made in accordance with an embodiment of the invention.

The circular pore region 302 typically has a diameter ranging between 0.5 to 25 cm. The holes of the porous region preferably have an exit diameter of less than 10 microns, and a pitch (the offset defining a distance between the holes) of less than 25 microns. FIG. 5 shows a scanning electron microscope (SEM) image of pores according to an example of the present invention. The SEM image shows pore exit diameters of 3.78 and 3.67 microns, entrance diameters of 8.45 and 8.23 microns, and a pitch of 17.51 microns. The tear prevention ring 303 is defined by a portion of the polyimide film having no holes that surrounds the perimeter of the circular pore region 302 as shown in FIG. 3. The width of the tear prevention ring 303 typically ranges between 0.5 and 5 mm.

In one aspect, the membrane filter may have a circular shape with a circular interior pore region, and a tear-resistant boundary region surrounding the pore region. Other shapes for the pore region can include squares or rectangles with either sharp or rounded corners. The boundary region may have any shape and may differ in shape from the pore region, so long as the boundary region reduces the potential for tearing of the pore region. The boundary region may have a width sufficient to provide mechanical strength to the membrane filter. This may include for example, a width of, for example, that is a percent of the diameter of the pore region, such as for example between 5 to 20% of the diameter of the pore region. The width of the boundary region may also be expressed as a unit of length such as 1 to 20 mm, preferably 1.5 to 10 mm, and more preferably 2 to 5 mm, such as, for example, 2.5 mm.

In one respect, the light may be used to pattern several membrane filters on a large substrate, each membrane filter comprising a tear-resistance region surrounding the pore region. For example, individual membrane filters may include a pore region with a diameter ranging from 0.5 to 10 cm, preferably 1.5 to 5 cm, and most preferably between 1.75 and 2.5 cm, such as, for example, 2.0 cm (314 mm2). The substrate may be of a size that allows patterning tens, hundreds, or thousands of individual membrane filters on a single substrate. The membrane before patterning individual filters desirably has a size that is equal to that of the glass substrate upon which the membrane is patterned. The size of the substrate and membrane may be limited by the capacity of the equipment to handle larger substrate sizes. Current equipment can process substrates having a size of 0.1 $m^2$, such as between 0.13 and 0.36 $m^2$, including up to 9.8 $m^2$. The substrate and thus membrane may have a size of greater than 0.1 $m^2$, preferably between 0.1 and 9.8 $m^2$, and more preferably between 1 and 9.8 $m^2$.

The tear prevention region of the present invention may be implemented on polymeric membrane materials made using other photolithographic techniques, such as photolithography processes used to create pores defined by uniform passages when a sacrificial material is selectively removed. U.S. patent application Ser. No. 17/067,528, entitled "TANGENTIAL FLOW CASSETTE-HF EMULATION" and filed Oct. 9, 2020, which describes such polymeric membranes and techniques. These methods allow formation of pores having a minimum pore size defined by the thickness of a sacrificial layer. In many cases, the minimum dimension of pores made using this technique may range from 20 to 1000 nm. The thickness of membranes made according to these techniques preferably ranges from 2-10 microns. These membranes include a plurality of first membrane material layer strips, a second membrane material binding to each of the plurality of first membrane material layer strips, the second membrane material comprising a plurality of windows exposing each of the first membrane material strips, wherein the biocompatible polymeric filtration membrane comprises pores defined by uniform passages defined by the first membrane material layer strips and the second membrane material layer that fluidically connect within each window. These methods may define a tear-resistant boundary region at the time of photolithographically defining a segmentation region in the second or last deposited polymer layer. Although it is desirable to form the segmentation region at the same time as an earlier step, the segmentation layer may be formed at a later photolithographic step, or one used solely for the purpose of defining a segmentation layer if desired.

Other embodiments and uses of the invention will be apparent to those skilled in the art from consideration of the specification and practice of the invention disclosed herein. All references cited herein, including all U.S. and foreign patents and patent applications, are specifically and entirely hereby incorporated herein by reference. It is intended that the specification and examples be considered exemplary only, with the true scope and spirit of the invention indicated by the following claims.

What is claimed is:

1. A method for making a tear-resistant liquid-filtering porous membrane comprising:
   a) depositing a photoresist layer on the top surface of a substrate, the substrate comprising a support layer, a polymer layer, and a hard mask layer;
   b) exposing the photoresist to a pattern of light;
   c) developing the photoresist layer to provide a first pattern of openings in the photoresist layer that expose portions of the hard mask layer;
   d) etching the exposed portions of the hard mask layer to provide a second pattern of openings in the hard mask layer that expose portions of the underlying polymer layer;
   e) removing the photoresist;
   f) etching the polymer layer through the second pattern of openings in the hard mask layer thereby providing a third pattern of openings in the polymer layer, the third pattern of openings including a pore region and a segmentation region surrounding the pore region with a tear-resistant boundary region between the pore-region and the segmentation region, the pore region comprising a plurality of pores having a minimum dimension of less than 100 microns;
   g) removing the hard mask layer; and,
   h) releasing the polymer layer from the substrate, thereby providing the tear- resistant liquid-filtering porous membrane, wherein the pore region and the tear-resistant boundary region are defined by the pattern of light.

2. The method of claim 1, wherein the membrane prior to step f) has a surface area of at least 0.1 $m^2$ .

3. The method of claim 1, wherein the membrane has a thickness that ranges between 5 and 25 microns.

4. The method of claim 1, wherein the plurality of pores have an aspect ratio ranging from 0.5:1 to 20:1.

5. The method of claim 4, wherein the plurality of pores have an aspect ratio ranging from 2:1 to 5:1.

6. The method of claim 1, the minimum dimension being at least 1 micron.

7. The method of claim 1, wherein the minimum dimension ranges between 1 and 20 microns.

8. The method of claim 1, wherein the polymeric membrane comprises at least a material selected from polyimide, polyamide, polycarbonate, polyetherimide, polyether ketone, polyurethane, synthetic polymers, low-density polyethylene (LDPE), high-density polyethylene (HDPE), polypropylene (PP), polyvinyl chloride (PVC), polystyrene (PS), nylon, (polytetrafluoroethylene, thermoplastic polyurethanes (TPU), polyethylene, acrylate polymers, acrylate monomers, and/or acrylate elastomers.

9. The method of claim 1, wherein the polymeric membrane is polyimide.

10. The method of claim 1, wherein the pore region has a circular shape and the tear-resistant boundary region has a ring shape substantially surrounding the pore region.

11. The method of claim 1, wherein step f) comprises defining a plurality of tear-resistant liquid-filtering porous membranes.

12. The method of claim 11, wherein step h) comprises releasing the polymer layer from the substrate, thereby providing the plurality of tear-resistant liquid-filtering porous membranes.

* * * * *